United States Patent
Bansod et al.

(10) Patent No.: US 8,572,603 B2
(45) Date of Patent: Oct. 29, 2013

(54) INITIALIZING AN APPLICATION ON AN ELECTRONIC DEVICE

(75) Inventors: Aditya Bansod, San Francisco, CA (US); Brian Brantner, San Francisco, CA (US); John Simpson, Dublin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 753 days.

(21) Appl. No.: 12/554,467

(22) Filed: Sep. 4, 2009

(65) Prior Publication Data

US 2013/0167137 A1 Jun. 27, 2013

(51) Int. Cl.
  G06F 9/44 (2006.01)
  G06F 9/445 (2006.01)
  G06F 15/177 (2006.01)

(52) U.S. Cl.
  USPC ........... 717/177; 717/172; 717/174; 717/178; 709/220; 709/222

(58) Field of Classification Search
  None
  See application file for complete search history.

(56) References Cited

U.S. PATENT DOCUMENTS

| | | | |
|---|---|---|---|
| 5,918,012 A * | 6/1999 | Astiz et al. | 709/217 |
| 5,956,483 A * | 9/1999 | Grate et al. | 709/203 |
| 6,064,977 A * | 5/2000 | Haverstock et al. | 705/7.18 |
| 7,086,032 B2 | 8/2006 | Nirell et al. | |
| 7,213,204 B1 * | 5/2007 | Dutta | 715/235 |
| 7,287,256 B1 | 10/2007 | Lozben et al. | |
| 7,370,095 B2 * | 5/2008 | Sauvage et al. | 709/220 |
| 7,370,320 B1 | 5/2008 | Grossman et al. | |
| 7,373,604 B1 | 5/2008 | Asch | |
| 7,779,034 B2 * | 8/2010 | Pedersen et al. | 707/781 |
| 8,312,450 B2 * | 11/2012 | Gangadharappa et al. | 717/178 |
| 2002/0091788 A1 * | 7/2002 | Chlan et al. | 709/213 |
| 2002/0124061 A1 * | 9/2002 | Mossman | 709/220 |
| 2003/0093508 A1 * | 5/2003 | Li et al. | 709/222 |
| 2003/0131314 A1 * | 7/2003 | Lin et al. | 715/501.1 |
| 2004/0261023 A1 * | 12/2004 | Bier | 715/530 |
| 2005/0120039 A1 * | 6/2005 | Amys et al. | 707/102 |
| 2006/0277469 A1 * | 12/2006 | Chaudhri et al. | 715/709 |
| 2007/0083522 A1 * | 4/2007 | Nord et al. | 707/10 |
| 2007/0244987 A1 * | 10/2007 | Pedersen et al. | 709/217 |
| 2009/0260022 A1 * | 10/2009 | Louch et al. | 719/328 |

OTHER PUBLICATIONS

"Learning Flash Lite 1.x ActionScript". Copyright 2007. Adobe Systems Incorporated. Available: http://livedocs.adobe.com/flash/9.0/main/flashlite_as_learning.pdf.*

(Continued)

Primary Examiner — Henry Tsai
Assistant Examiner — Michael Sun
(74) Attorney, Agent, or Firm — Wolfe-SBMC (57) ABSTRACT

Methods, systems, and apparatus, including computer programs encoded on a computer storage medium, for initializing an application on an electronic device. In one aspect, a method includes detecting, in an electronic device, an instruction to initialize an application from a package installed on the electronic device, the application configured to be embedded in a page conforming with hypertext markup language (HTML) and use an HTML compliant variable for initialization, wherein the application is not initialized in an HTML compatible browser application, obtaining, in response to the instruction and from a file in the package, an application file name for an application file and at least one value for the HTML compliant variable, loading the application file identified by the application file name such that the application is initialized and executed on the electronic device, and providing the value to the application for the initialization.

24 Claims, 4 Drawing Sheets

(56) References Cited

OTHER PUBLICATIONS

"Macromedia Flash (SWF) File Format Specification Version 6". Copyright 2002. Macromedia, Inc. Available: http://download.flashdig.com/docs/Flash-6.pdf.*

'PhoneGap: Bridging the gap between the web and iPhone SDK' [online], Phone Gap, 2008 [retrieved on Nov. 4, 2011]. Retrieved from the Internet: <URL:http://web.archive.org/web/20080903172345/http:/www.phonegap.com/>.

Taft, Darryl. 'PhoneGap Simplifies iPhone, Android, BlackBerry Development' [online]. Ziff Davis Enterprise Holdings Inc., 2009 [retrieved on Nov. 4, 2011]. Retrieved from the Internet: <URL:http://www.eweek.com/c/a/Application-Development/PhoneGap-Simplifies-iPhone-Android-BlackBerry-Development-788189/>.

'SWF' [online]. Wikipedia, 2008 [retrieved on Nov. 4, 2011]. Retrieved from the Internet: <URL:http://web.archive.org/web/20080902164858/http:/en.wikipedia.org/wiki/SWF>.

* cited by examiner

INITIALIZING AN APPLICATION ON AN ELECTRONIC DEVICE

BACKGROUND

This specification relates to initiating application programs on an electronic device, such as a handheld or other mobile device. A web browser is a software application for retrieving, presenting, and traversing information resources on the World Wide Web. An information resource is identified by a Uniform Resource Locator (URL) and may be a web page, image, video, or other piece of content. Hyperlinks present in resources enable users to easily navigate their browsers to related resources. Aside from hypertext markup language (HTML), web browsers can generally display any kind of content that can be embedded as part of a web page. Most browsers can display images, audio, video, and XML files, and often have plug-ins to support embedded applications, such as Flash applications, and Java applets.

SUMMARY

In general, one aspect of the subject matter described in this specification can be embodied in methods that include the actions of detecting, in an electronic device, an instruction to initialize an application from a package installed on the electronic device, the application configured to be embedded in a page conforming with hypertext markup language (HTML) and use an HTML compliant variable for initialization, wherein the application is not initialized in an HTML compatible browser application, obtaining, in response to the instruction and from a file in the package, an application file name for an application file and at least one value for the HTML compliant variable, loading the application file identified by the application file name such that the application is initialized and executed on the electronic device, and providing the value to the application for the initialization. Other embodiments of this aspect include corresponding systems, apparatus, and computer programs, configured to perform the actions of the methods, encoded on computer storage medium.

These and other embodiments can each optionally include one or more of the following features. The one or more aspects can also include loading a proxy file, wherein loading the proxy file causes the application file name and the value for the HTML compliant variable to be obtained, the application file to be loaded, and the value to be provided to the application for initialization. The file includes extensible markup language and the application file has a swf format. The one or more aspects can also include executing a program configured for the swf format on the electronic device, wherein the application generates output on the electronic device using the program. Providing the value to the application for the initialization can also include initializing the application file with the value. The electronic device includes at least one selected from the group consisting of a wireless device, a mobile device, a cellular telephone, a consumer electronics device, a consumer appliance, and combinations thereof. The one or more aspects can also include registering, after the initialization, information reflecting at least one action that a user performs with the electronic device using the application and forwarding the information to a system that receives and records corresponding information from other devices. The electronic device and another electronic device can include first and second mobile portable devices, respectively, wherein the one or more aspects can also include receiving an input in the first mobile portable device prompting the application to be shared from the first mobile portable device to the second mobile portable device and in response to the input, forwarding the package from the first mobile portable device to the second mobile portable device, wherein the package is thereafter installed on the second mobile portable device. The application can be initialized on the electronic device without being embedded in an HTML page.

In general, another aspect of the subject matter described in this specification can be embodied in methods that include the actions of detecting, in a server device, an instruction to send a package for an application to an electronic device, the application configured to be embedded in a page conforming with hypertext markup language (HTML) and use an HTML compliant variable for initialization, wherein the application is not initialized in an HTML compatible browser application, generating at least one value for the HTML compliant variable for the electronic device; and forwarding, in response to the instruction, the package for installation on the electronic device, the package including a file that contains an application file name for an application file and the value for the HTML compliant variable. Other embodiments of this aspect include corresponding systems, apparatus, and computer programs, configured to perform the actions of the methods, encoded on computer storage medium.

These and other embodiments can each optionally include one or more of the following features. The application can generate output on the electronic device using a program configured for swf format, and wherein the value is generated to be compliant with the program. The electronic device includes at least one selected from the group consisting of a wireless device, a mobile device, a cellular telephone, a consumer electronics device, a consumer appliance, and combinations thereof. The one or more aspects can also include receiving, after forwarding the package, information from the electronic device reflecting at least one action that a user performs with the electronic device using the application and recording the information in association with corresponding information from other devices.

In general, another aspect of the subject matter described in this specification can be embodied in methods that include the actions of generating a packaging tool configured to generate a package for an application to be installed on an electronic device, the application configured to be embedded in a page conforming with hypertext markup language (HTML) and use an HTML compliant variable for initialization, the package including (a) an application file, (b) at least one value for the HTML compliant variable, and (c) an application file name for the application file and a communication tool configured to detect an instruction to send the package to the electronic device, prompt the packaging tool to generate a package, and to forward, in response to the instruction, the package for installation on the electronic device, wherein the application file name is obtained from the package and used to load the application file into the object with the value for initializing the application, and wherein the application is not initialized in an HTML compatible browser application. Other embodiments of this aspect include corresponding systems, apparatus, and computer programs, configured to perform the actions of the methods, encoded on computer storage medium.

These and other embodiments can each optionally include one or more of the following features. The packaging tool and the communication tool are generated in a tool configured to create content for the page compliant with HTML. The one or more aspects can also include loading a proxy file, wherein loading the proxy file causes the application file name and the value for the HTML compliant variable to be obtained, the application file to be loaded, and the value to be provided to the application for initialization. The page compliant with HTML is created in a tool that is not part of the computer program product and that is separate from the packaging tool and the communication tool.

Particular embodiments of the subject matter described in this specification can be implemented to realize one or more of the following advantages. By initializing applications using a file, applications can be run outside of the runtime environment that the application was designed to run in. This allows for wider application distribution because the applications can be executed in more runtime environments. For example, applications not configured to be run on mobile devices can be run on those mobile devices. Furthermore, because the file is included in an application package generated using a packaging tool, developers of the applications need not be concerned with generating additional code to allow the applications to operate outside of their designed runtime environments. Moreover, applications can be shared in peer-to-peer transactions by exchanging the application packages between devices. The manner in which the application is initialized can also be used to track application usage and that usage information can be used to provide cross promotional suggestions when users request application packages.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
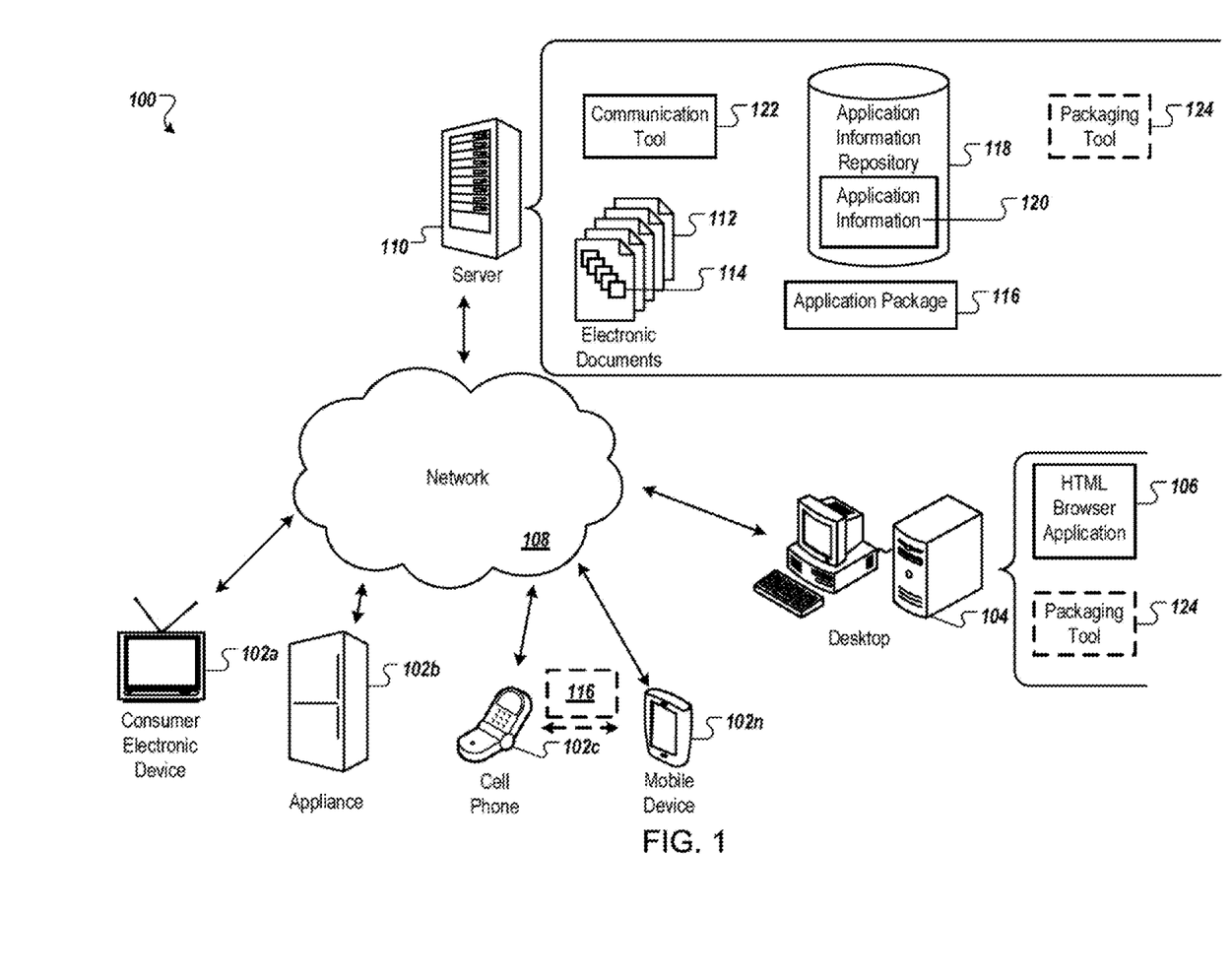
FIG. 1 shows an example system that can be used to provide one or more application packages to one or more electronic devices.

FIG. 1 shows an example system 100 that can be used to provide one or more application packages 116 to one or more electronic devices 102a-102n. In general, an application package 116 is a collection of electronic files, documents or other items that can be used to install and initialize an application on the device. In some implementations, the application package 116 can include code or other instructions that when executed can initialize an application on the device. An electronic document (which for brevity will simply be referred to as a document) may, but need not, correspond to a file. The document may be stored in a portion of a file that holds other documents, in a single file dedicated to the document in question, or in multiple coordinated files. Examples are described below where an application that is embedded in a page conforming with hypertext markup language (HTML) is then packaged for installation on an electronic device, wherein the application is not initialized in any HTML compatible browser application on the electronic device.

In some implementations, once the application package 116 is installed on an electronic device 102a-102n, the application package 116 can be used to initialize an application that is loaded outside the runtime environment that the application was designed for. For example, in some implementations, applications are designed to run in an HTML compliant browser application. That is, the HTML compliant browser application is the runtime environment for those applications. As such, in some implementations, the installed application package 116 can be used to initialize the application embedded in a hypertext markup language (HTML) document in a non-HTML compatible browser application. An example application package 116 is described in more detail below.

The system 100 includes any number of electronic devices 102a-102n, a network 108, and any number of servers 110. In some implementations, the system 100 can optionally include any number of desktop computers 104. In some implementations, the desktop computers include an HTML browser application 106 and optionally include a packaging tool 124. For simplicity, the system is shown as only having one server 110, a limited number of electronic devices 102a-102n, and one desktop computer 104, but it should be understood that the system 100 can include any number of servers 110, electronic devices 102a-102n, and desktop computers 104, according to particular implementations.

In general, the electronic devices 102a-102n can include any device that is coupled to a display device, includes a processor that can generate output for presentation on the display device and includes a computer readable storage medium. For example, electronic device 102c is a cell phone that includes an integrated liquid crystal display (LCD), a processor (e.g., one or more central processing units (CPUs)), and memory (e.g., random access memory (RAM), read only memory (ROM), or other types of memory). As another example, electronic device 102b is a refrigerator that includes an integrated LCD display, a processor and memory, which can be similar to the display, the processors, and the memory included in the cell phone, according to particular implementations. As another example, an electronic device can include a consumer electronics item such as an electronic picture frame for presenting digital images and/or video clips. Other types of displays, processors, and memory can also be included in the electronic devices 102a-102n. For example, electronic devices 102a-102n can include cathode ray tube (CRT) displays, plasma displays, and projection displays, to name a few examples.

In some implementations, the electronic devices 102a-102n can be devices that are not integrated with a display device. For example, in some implementations, any of the electronic devices 102a-102n can include a video game console, a Blu-Ray player, a digital video disk (DVD) player, or other electronic devices that can be communicatively coupled to a display device. For example, a video game console can be communicatively coupled to a television or other display device by connecting the video game console to the display device using a high definition multimedia interface (HDMI) cable, a composite video cable, a separate video (S-video) cable, or other type of connection.

The electronic devices 102a-102n can communicate with a server 110 over a network 108. The network 108 is any network that can facilitate communications between the servers 110 and any of the electronic devices 102a-102n and the desktop computers 104. Examples include local area networks (LANs) and wide area networks (WANs) such as intranets, and The Internet, respectively. In some implementations, the network 108 can be a collection of one or more networks that communicate with each other to form a larger network. In general, network 108 implements a communication protocol (e.g., Transmission Control Protocol/Internet Protocol (TCP/IP), User Datagram Protocol (UDP), and other protocols) to exchange data between two or more sources (e.g., any of the servers 110 and any of the electronic devices 102a-102n and desktop computers 104).

In general, the servers 110 can be blade servers, workstations, laptops, or any other computing device that provides data stored on associated computer readable medium. The servers can provide data that corresponds to one or more electronic documents 112 and provide the data to one or more electronic devices 102a-102n or desktop computers 104 over the network 108. The servers 110 can be web servers, application servers, combinations of these or other types of servers. The servers can include one or more electronic documents 112, one or more application packages 116, an application information repository 118, and a communication tool 122. In some implementations, the servers 110 can also include an optional packaging tool 124.

In some implementations, the documents 112 correspond to one or more web pages. For example, the servers 110 can include one or more HTML documents 112 that correspond to one or more web pages. The servers 110 can provide the contents of the documents 112 to any of the electronic devices 102a-102n and the desktop computers 104. For example, the servers 110 can provide HTML code using the network 108 that when interpreted by an application executing on the desktop computers 104, presents the contents of the document 112 on any of the desktop computers 104. That is, for example, an application, such as an HTML compatible browser application 106 can be executed by the desktop computer 104 to interpret HTML code received from the servers 110. Example HTML compatible browser applications 106 include, but are not limited to, Internet Explorer, developed by Microsoft Corporation of Redmond, Wash. and Firefox developed by Mozilla Corporation of Mountain View, Calif.

Furthermore, the electronic documents 112 can include embedded content, including, but not limited to, one or more embedded applications 114. In addition, each document 112 can include instructions, that when interpreted, cause the HTML compatible browser application 106 to load one or more applications 114 or other content embedded in the documents 112. Moreover, in some implementations, the documents 112 can include one or more initialization values that are used to initialize the applications 114. For example, the documents 112 can include one or more HTML name-value parameters that are accessed by the browser application 106 and provided to the applications 114. These name-value parameters can be use to initialize various aspects of the applications 114, according to particular implementations of the applications 114.

The communication tool 122 is configured to detect a request to send the application package 116 to the requesting electronic device 102a-102n, and to forward the application package 116 to the requesting electronic device 102a-102n. In some implementations, the communication tool 122 can optionally prompt the packaging tool 124 to generate an application package 116.

The packaging tool 124 is configured to generate an application package 116 for an embedded application 114. The application package 116 generated by the packaging tool 124 is provided to the communication tool 122 such that the communication tool 122 can forward the application package 116 to the requesting electronic device 102a-102n. In some implementations, the packaging tool 124 creates an archive of one or more electronic documents according to the embedded application. That is, in some implementations, the packaging tool 124 generates one or more electronic documents that include one or more mechanisms for initializing the application 114. Once the packaging tool 124 generates the application package 116, the packaging tool 124 can provide the application package 116 to the communication tool 122. For example, in some implementations, the packaging tool 124 can use inter-process messages, an application program interface (API), combinations of these, file transfer protocol (FTP) requests, or other techniques to provide the application package 116 to the communication tool 122.

In some implementations, the packaging tool 124 can first be used to generate an application package 116 and provide it to any of the servers 110. In such implementations, the communication tool 122 can forward the pre-generated application package 116 to the requesting electronic device 102a-102n in response to receiving a request for the application package 116 from any of the electronic devices 102a-102n. For example, the packaging tool 124 can be optionally located on the desktop computer 104. In such implementations, in response to receiving input from a user, process, or other executing program logic, the packaging tool 124 can generate an application package 116 and provide it to the server 110 by sending the application packaging to the server 110 using the network 108. That is, in some implementations, the combination of the communication tool 122 and the packaging tool 124 allows a user of the electronic devices 102a-102n to receive one or more application packages 116 corresponding to one or more embedded applications 114 that are identified by browsing a web page that includes one or more embedded applications 114. For example, a user can use browser application 106 on desktop computer 104 to identify one or more embedded applications 114 in documents 112, enter their cell phone number (or other device identifier), which is sent to the servers 110, receive a message on the electronic device 102a-102n, select a link or other instructions included in the message, and receive the corresponding application packages 116. In some implementations, the devices 102a-102n are configured with a browser application 106. In such implementations, the user of devices 102a-102n can use the browser application to view the documents 112 and select the embedded application 114 in addition to or instead of providing a cell phone number or other device identifier to the communication tool 122.

To further illustrate the communication tool 122 and the packaging tool 124, consider the following example. In some implementations, a user may wish to execute the embedded applications 114 in a non-HTML compatible run-time environment. Such a situation can arise when the user does not want to continually revisit the web page or otherwise view the documents 112 to access the embedded application 114, or because the browser application on the device 102a-102n is not capable of displaying the embedded application 114, to name a few examples.

In some implementations, the user can provide input to any of the electronic devices 102a-102n or desktop computer 104, such as a keyboard input, a touchscreen input, a mouse input, a stylus input, voice input, or other input. That is, the user can provide input to the any electronic devices 102a-102n or desktop computer 104 requesting a particular embedded application 114 on any of the documents 112. For example, a user can view a web page with one or more embedded applications using a browser application, such as on a personal computer. Here, this application is one that the user wishes to have installed on another device, such as a cell phone. The user can select at least one of the embedded applications and enter a phone number of the user's cell phone (or other device). In response, any of the electronic devices 102a-102n can send a message to the servers 110 requesting that the embedded application 114 be forwarded to the specified number. That is, the communication tool 122 can detect the message sent by any of the electronic devices 102a-102n requesting the embedded application 114.

In response, the communication tool 122 locates the application corresponding to the received request. For example, the communication tool 122 can access a storage device on the severs 110 to locate the appropriate application package 116. The communication tool 122 can then forward the application package 116 to any of the electronic devices 102a-102n using the network 108. For example, the communication tool 122 can provide a text message, an email, or other message to any of the electronic devices 102a-102n. In some implementations, the message includes the application package 116. In other implementations, the message can include a uniform resource locator (URL) or other instructions that specifies how to retrieve the application package 116. Furthermore, in some implementations, the message can automatically initiate a download of the application package 116 to any of the electronic devices 102a-102n. In other implementations, the user of the electronic device 102a-102n can provide input that initiates the transfer of the application package 116 from the servers 110 to the electronic device 102a-102n. For example, the user can select a hyperlink or other link in the received message to initiate the download of the application package 116.

In some implementations, the communication tool 122 can prompt the packaging tool 124 to generate the application package 116. In such implementations, when the communication tool 122 receives a request, the communication tool 122 can prompt the packaging tool 124 using inter-process messages, an API, combinations of these, or through other techniques. In response, the packaging tool 124 can generate the application package 116 and provides it to the communication tool 122 using inter-process messages, an API, combinations of these, or through other techniques. The communication tool 122 can then forward the generated application package 116 using techniques described above.

Once the electronic device 102a-102n receives the application package 116, the electronic device 102a-102n can install the application package 116. For example, in some implementations, the devices 102a-102n can extract the contents of the application package 116 and store the contents on the computer readable medium included in the electronic device 102a-102n.

In some implementations, the message sent by the communication device 122 to the electronic devices 102a-102n can optionally include advertisements or other content that specifies additional related application packages 116. For example, a message generated in connection with an application package 116 corresponding to an application that provides up-to-the-minute sports scores can include an advertisement for an application package 116 corresponding to an application that provides access to various sports highlights. In some implementations, if the user interacts with the advertisement (e.g., selecting the suggested application package 116), the user can be charged a fee and the electronic device 102a-102n is provided with the suggested application package 116.

In some implementations, the application packages 116 can be sent by a first electronic device 102a-102n and received by a second electronic device 102a-102n without communicating with the servers 110. For example, the cell phone 102c can receive user input corresponding to an instruction (e.g., an email, text message, or other instruction) to send an application package from the cell phone 102c to the mobile device 102n. In response, the cell phone 102c can transmit the application package 116 using network 108. For example, the application package can be attacked to an email, a text message, or other types of messages, and delivered to the mobile device 102n.

As another example, the mobile device 102n can send a request (e.g., a text message, an email, or other message) to the cell phone 102c requesting an application corresponding to an application package 116 that is installed on the cell phone 102c. In response, the cell phone 102c can forward the requested package 116 to the mobile device 102n using the network 108. For example, the cell phone 102c can send an email, text message, or other types of messages to the mobile device 106n. When the mobile device 102n receives the message and the corresponding application package 116, the mobile device 102n can install the application package 116 as if the mobile device 102n had received the application package 116 from the servers 110. In some implementations, the cell phone 102c can send the URL or other instructions received by the servers 110 instead of, or in addition to, sending the application package 116 in the message to the mobile device 102n. In such implementations, the user of the mobile device 102n can select the URL or other instructions to receive the application package 116 in a similar manner to the user of the cell phone 102c.

Once the application package 116 is installed on any of the electronic devices 102a-102n, a user can load the corresponding application 114 without initializing the application 114 in the original run-time environment of the application 114. For example, the user can execute the application 114 on the electronic device 102a-102n that is normally embedded in HTML documents without first executing an HTML compatible browser application. That is, the application package 116 can be used to initialize the application 114, and therefore, the application 114 need not be initialized by an HTML compatible browser application. Techniques for initializing the application 114 are described in more detail below. In some implementations, when the user initializes the application 114 using the application package 116, usage information corresponding to actions that the user performs with the electronic device 102a-102n and the application 114 can be forwarded to the servers 110. In response, the servers 110 can store the usage information in the application information repository 118.

The application information repository 118 is configured to store information regarding the usage of one or more of the applications 114 across any number of electronic devices 102a-102n. That is, one or more actions that any users perform on any of the electronic devices 102a-102n using the application 114 can be recorded. For example, the number of times a user loads an application 114 (or combination of applications) on the electronic device 102a-102n can be recorded and stored in the application information repository 118 as application information 120. As another example, the high score of an interactive game application can be recorded and stored in the application information repository 118 as application information 120. Other information can also be recorded and stored in the application information repository 118. In some implementations, the application information 120 can be stored in one or more electronic documents. Example documents include, but are not limited to, a text file, one or more database files corresponding to one or more records of a database, or other files stored on the computer readable medium of the server 110.

Furthermore, the application information 120 can be used to refine suggestions regarding additional related application packages 116 to users. For example, if the up-to-the-minute sports scores application and the sports highlight application are loaded on the same electronic device 102a-102n a sufficient number of times, the communication tool 122 can suggest that a user retrieve the up-to-the-minute sports scores application package 116 when the user requests the sports highlight application package 116, and vise versa.

Figure 2:
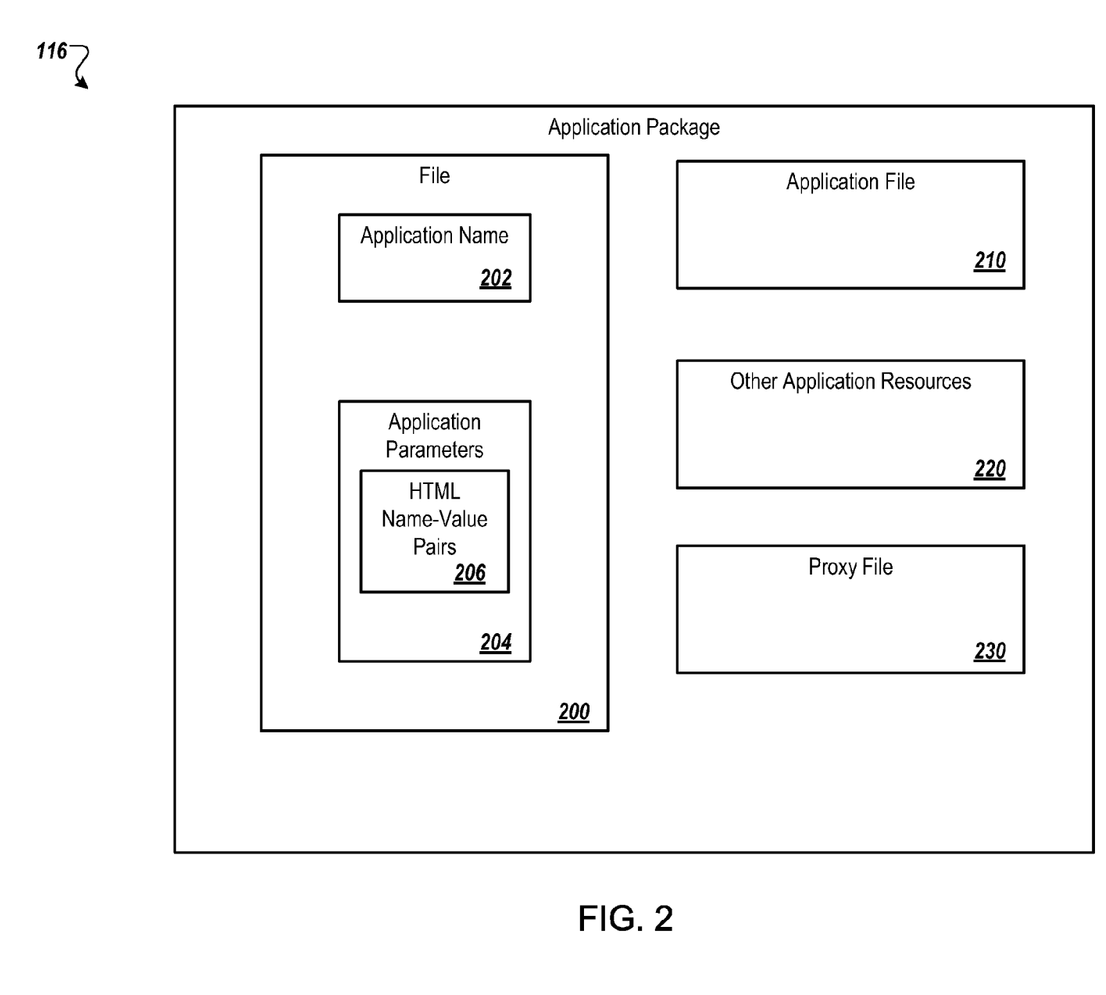
FIG. 2 shows an example application package that can be received by and stored on an electronic device.

FIG. 2 shows an example application package that can be received and stored by an electronic device 102a-102n. The application package 116 includes a file 200, an application file 210, other application resources 220, and a proxy file 230. For convenience, FIG. 2 will be described in connection with a clock application that corresponds to the application package 116. In other implementations, one or more packages for other types of applications can be received and stored by any of the electronic devices 102a-102n.

The file 200 includes an application name 202 and one or more application parameters 204. In some implementations, the file 200 is an extensible markup language (XML) file. For example, in one implementation, the file 200 is an XML file named "Clock.xml." The application name 202 specifies the name of the application file 210. For example, in one implementation, the application name 202 is specified in XML as the XML attribute "<widgetname>widget_clock</widgetname>." The application parameters include one or more HTML name-value pairs 206. In some implementation, the HTML name-value pairs 206 are formatted in the file 200 as CDATA sections to maintain their characters in an original form. For example, in one implementation, the name-value pairs 206 corresponding to the colors of the clock can be specified in XML as the XML attributes "<flashvars><colors><![CDATA[0xFF0000, 0xFF34FF, 0x650099, 0x0000FF, 0x00CC00, 0xFFFF00, 0xFF6500, 0x663300, 0xFFFFFF, 0x888888, 0x000000]]></colors><currIndexes><![CDATA[1,2,3,4]]></currIndexes></flashvars>."

In general, the application file 210 includes functionality implemented by the embedded application 114. For example, in one implementation, the application file "widget_clock.swf" includes the functionality of the clock application. That is, the "widget_clock.swf" application file 210 includes instructions that perform operations including moving the clock hands, changing the face of the clock, and other operations that the clock application implements, to name a few examples.

The proxy file 230 is configured to access the file 200 and provide the application parameters 204 to the application file 210. For example, in one implementation, the proxy file "proxy.swf" is loaded first whenever the user requests to load the clock application. In response, instructions included in the proxy file 230 can access the file 200, and provide the application parameters 204 to the application file 210 specified by the application name 202.

The other application resources 220 can include graphical indicia that the electronic device 102a-102n uses to present representations of the application to the user of the electronic device 102a-102n. For example, the other application resources 220 can include icons or other images (e.g., "Clock.ico" and "Clock.png" files, respectively) that can be presented to the user. That is, in some implementations, if the user selects one of these representations the electronic device 102a-102n attempts to load the application corresponding to the representation using various techniques described herein. For example, in some implementations, if the user taps the clock icon on a touchscreen, the electronic device 102a-102n can execute instructions included in the proxy file 230 including accessing the file 200 and loading the clock application specified by the application file 210. Furthermore, instructions included in the proxy file 230 can initialize the clock application by providing the application parameters 204 to the application file 210.

In some implementations, the other application resources 220 can also include additional configuration information or other information that is used by the application at run-time. For example, in one implementation, the other application resources 220 also include "widget_clock.xml" and "widget_preferences.swf" that can be used to further configure the clock application.

Figure 3:
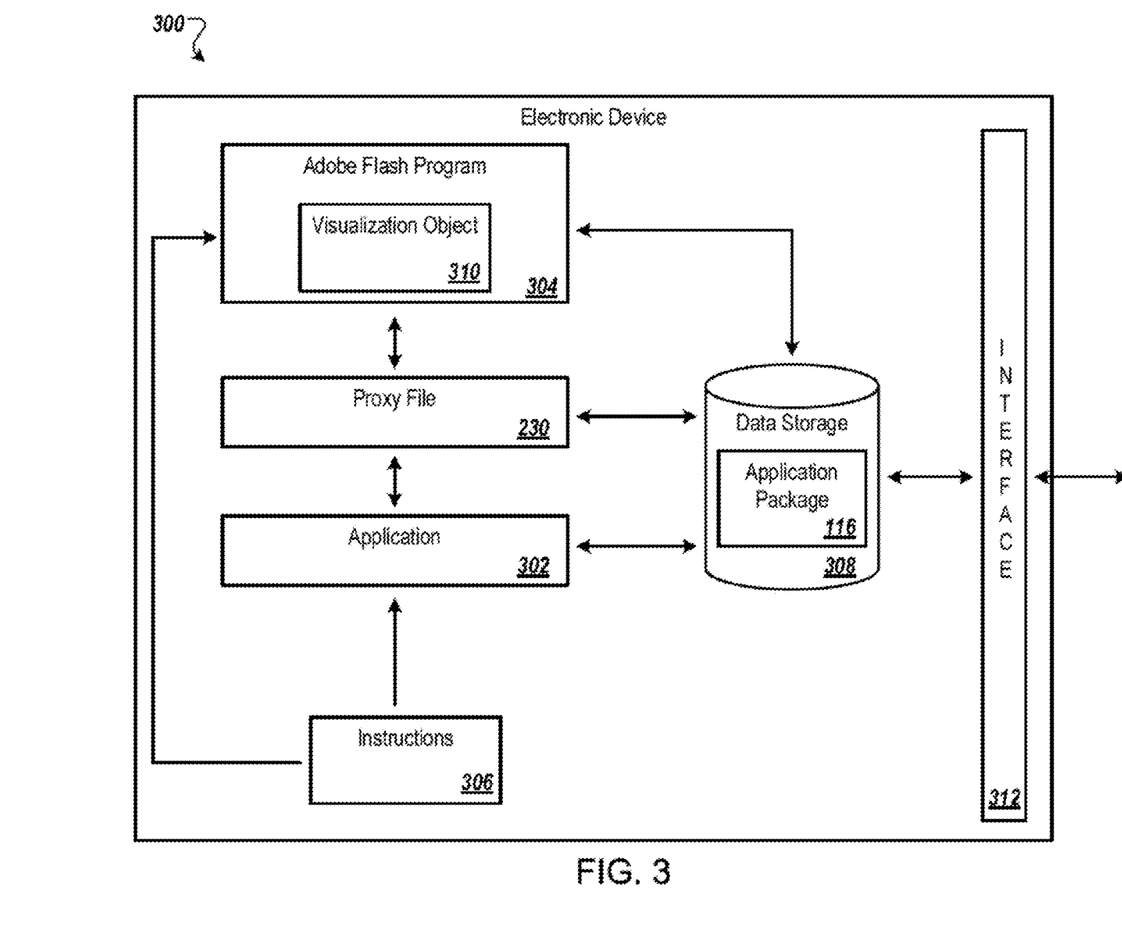
FIG. 3 shows an example electronic device that can initialize an application using a received application package.

FIG. 3 shows an example electronic device 300 that can initialize an application 302 using a received application package 116. In general, the electronic device 300 can be any of the electronic devices 102a-102n depicted in the example of FIG. 1 or other electronic devices, according to particular implementations. For convenience, the electronic device 300 will be described in reference to FIG. 1 and FIG. 2. The electronic device 300 includes an application 302, a program 304 configured for swf format, such as an Adobe® Flash® program developed by Adobe Systems Incorporated of San Jose, Calif., one or more instructions 306, data storage 308, and an interface 312.

In the following, an Adobe® Flash® program is described as an example. In some implementations, any other swf-compatible program can be used, such as any program designed to display animated vector graphics based on one or more swf files.

In general, the electronic device 300 is configured to detect one or more instructions 306. In some implementations, the instructions 306 are generated by another process, by executing program logic, or in response to received input from a user. For example, in response to receiving input from a user corresponding to a selection of a graphical representation of an application, an operating system (OS) installed on the electronic device 300 can generate an instruction to initialize the application corresponding to the graphical representation. Examples of input include, but are not limited to, a mouse click, keyboard, or other input that interacts with an icon or other graphical representation of an application.

In response to detecting the instruction 306, the electronic device 300 attempts to initialize the application 302. For example, the electronic device 300 can reference the application package 116 and provide the proxy file to the program 304. In response, the program 304 can execute the code or other instructions included in the proxy file 230. As such, the instructions included in the proxy file 230 can cause the one or more application parameters 204 in the application package 116 to be provided to the application 302 referenced by the application name 202 in the file 200. These application parameters 204 can be used to initialize the application 302. The application 302 is any application 302 that can be embedded in a document. For example, the application 302 can be an application 114 that is embedded in an HTML document. As another example, the application 302 can be the application file 210 included in the application package 116. In some implementations, the application 302 is provided to the program 304 which loads the application in the Adobe® Flash® runtime environment. In some implementations, the application 302 can communicate with the program 304. For example, referring back to the clock application example, as the hands of the clock move according to the instructions of the clock application, the application 302 generates output that is provided to the program 304. In response, the program 304 presents the updated position of the clock hands to the user. That is, the application 302 can generate output, that when received by the Adobe® Flash® program 304, causes the program 304 to present the application output to a user of the electronic device 300. In some implementations, the program 304 includes a visualization object 310 that the program 304 can use to present the application output to the user. For example, in some implementations, the visualization object 310 is a movieClip Flash® object.

In some implementations, the program 304 can communicate with the data storage 308. For example, the program 304 can access the application package 116 stored by the data storage 308 and load the proxy file 230. The proxy file 230 can reference one or more application parameters 204 included in the application package 116. In some implementations, these application parameters 204 are used to initialize the application 302.

In some implementations, the application 302 can communicate with the data storage 308. For example, the application 302 can store usage information on the data storage 308. Furthermore, the application 302 can reference other application resources 220 included in the application package 116 stored on the storage device 308 to configure one or more aspects of the application 302.

The interface 312 can comprise software (e.g., a communication protocol), hardware (e.g., an Ethernet card), or combinations of these. The interface 312 allows the electronic device 300 to communicate with other devices, such as server 110, or any of electronic devices 102a-102n, to name a few examples. That is, in some implementations, the interface 312 can send one or more application package requests, receive application packages 116, send application packagers 116, and store or otherwise install the application packages 116 on the electronic device 300 using the data storage 308. For example, when the electronic device 300 receives an application package 116 from the servers 110, the interface can provide the application package 116 to the data storage 308, which stores the application package 116.

The data storage 308 can be any variety of computer-readable storage including a hard drive, memory (e.g., read-only memory (ROM), random access memory (RAM), or other memory), or any other computer-readable storage. In some implementations, the data storage 308 communicates with the interface 312 allowing the interface 312 to store one or more application packages using the data storage 308.

Figure 4:
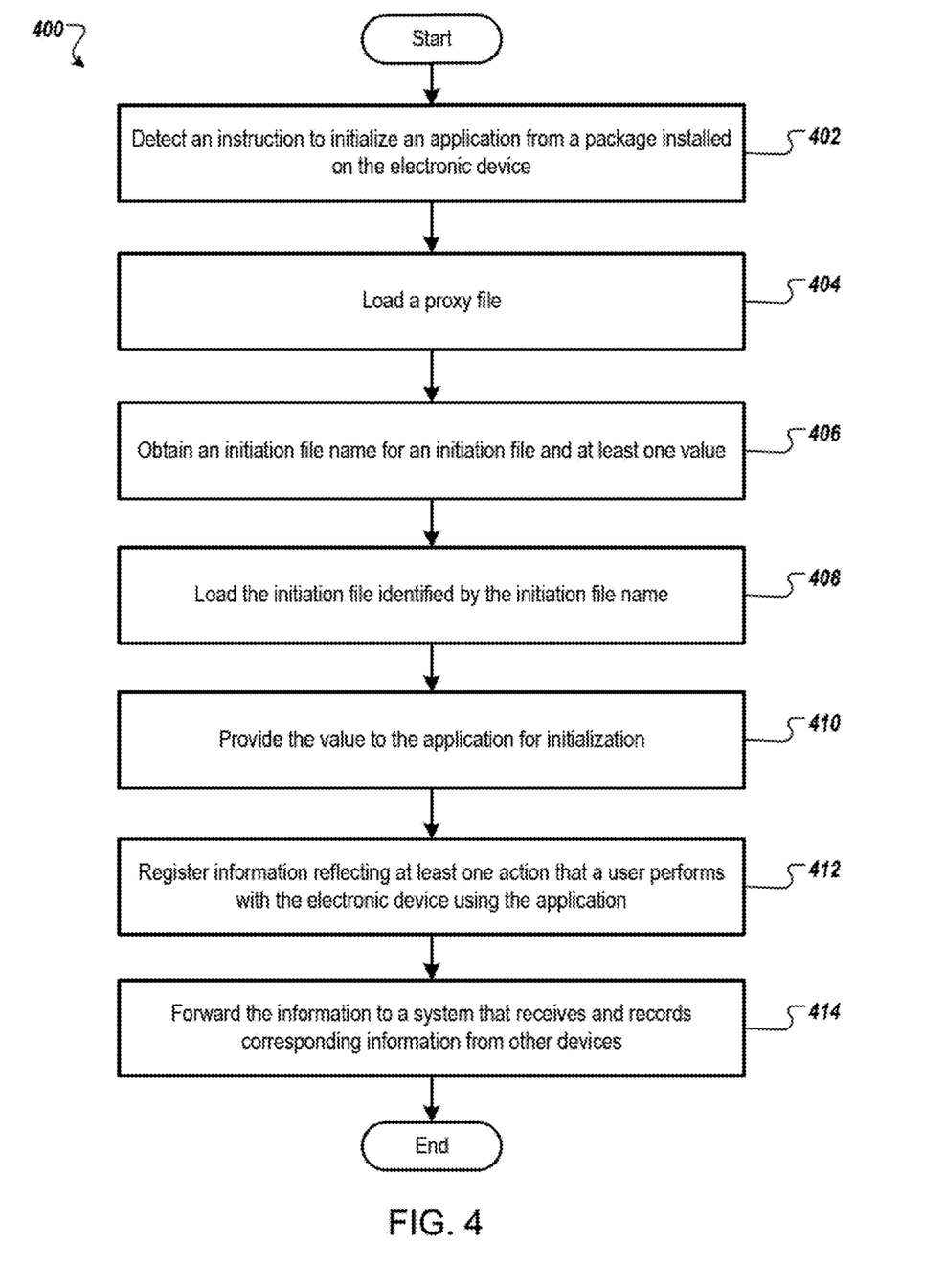
FIG. 4 shows an example technique that can be used to initialize an application on an electronic device.

FIG. 4 shows an example technique 400 that can be used to initialize an application on an electronic device 102a-102n. For convenience, the technique will be described in reference to FIGS. 1, 2, and 3, and an electronic device 300 that performs the technique 400.

In step 402, the electronic device 300 detects an instruction to initialize an application from a package installed on the electronic device 300. For example, a user of the electronic device 300 can provide input corresponding to a selection of an application installed on the electronic device 300. In some implementations, the input corresponds to a selection of a graphical representation of the application. For example, the input can be a touchscreen input or any other input on any of the electronic devices 102a-102n that selects a graphical representation of a clock application included in the other application resources 220 of the respective application package 116. In some implementations, the input can be captured by an operating system, process or executing program logic and can be used to generate an instruction 306 to initialize the application 302.

In step 404, the electronic device loads a proxy a file. For example, the electronic device 300 can reference the proxy file 230 included in the application package 116 and load the proxy file 230 by providing the proxy file to the program 304.

In step 406, the electronic device 300 obtains an application file name for an application file and at least one value. For example, instructions included in the proxy file 230 can be used to reference the file 200 included in the application package 116 to obtain an application name 202 and one or more application parameters 204 including one or more HTML name-value pairs 206.

In step 408, the electronic device 300 loads the application file identified by the application file name. For example, instructions included in the proxy file 230 can be used to load the "widget_clock.swf" by providing the application name 202, the application file 210, or both to the program 304. In some implementations, in response, the program 304 can initialize a visualization object 310 that can be used to the present application content. For example, the program 304 can initialize a movieClip object that can be used to present application content on any of the display devices coupled to the electronic devices 102a-102n. In some implementations, program 304 can specify one or more runtime flags of the visualization object to control aspects of the application 302. For example, the program 304 can set the lockRoot flag to true so that the application 302 does not accidentally reference any of the contents of the application package 116, such as the proxy file 230.

In step 410, the electronic device 300 provides the value to the application for initialization. For example, instructions included in the proxy file 230 can be used to provide the obtained name-value pairs 206 using an API, inter-process messaging, or using other techniques to provide the value to the file identified by the application file name 202, the application file 210, the program 304, or combinations of these.

In step 412, the electronic device 300 registers information reflecting at least one action that a user performs with the electronic device 300 using the application. For example, the electronic device can register when the application is launched using the application package 116. As another example, the electronic device 300 can register high scores of game applications, search strings of search applications, or other information related to the application, according to particular implementations of the application, the application package 116, or combinations of these.

In step 414, the electronic device 300 forwards the information to a system that receives and records corresponding information from other devices. For example, any of the electronic devices 102a-102n can forward the information to any of the servers 110 using network 108. Furthermore, the servers can receive and record the corresponding information from any of the electronic devices in application information repository 118, which maintains application information 120 for all of the electronic devices 102a-102n.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for initializing an application on an electronic device, the method comprising:
    installing, in an electronic device, a package that contains an uninitialized application that (i) is configured to be embedded in a page conforming with hypertext markup language (HTML) and (ii) requires an HTML compliant variable for initialization of the application;
    detecting, in the electronic device, an instruction to initialize the application in an environment that is not an HTML compatible browser application;
    obtaining, in response to the instruction and from a file in the package, an application file name for an application file and at least one initialization value for the required HTML compliant variable;
    loading the application file identified by the application file name; and
    providing the at least one initialization value to the application prior to initialization of the application; and
    wherein the application is initialized in the environment using the at least one initialization value and is executed on the electronic device.

2. The method of claim 1, further comprising:
    loading a proxy file, wherein loading the proxy file causes the application file name and the initialization value for the required HTML compliant variable to be obtained, the application file to be loaded, and the initialization value to be provided to the application prior to the initialization of the application.

3. The method of claim 1, wherein the file includes extensible markup language and the application file has a swf format.

4. The method of claim 3, further comprising:
    executing a program configured for the swf format on the electronic device, wherein the application generates output on the electronic device using the program.

5. The method of claim 1, further comprising initializing the application file with the initialization value.

6. The method of claim 1, wherein the electronic device includes at least one selected from the group consisting of: a wireless device, a mobile device, a cellular telephone, a consumer electronics device, a consumer appliance, and combinations thereof.

7. The method of claim 1, further comprising:
    registering, after the initialization, information reflecting at least one action that a user performs with the electronic device using the application; and
    forwarding the information to a system that receives and records corresponding information from other devices.

8. The method of claim 1, wherein the electronic device and another electronic device comprise first and second mobile portable devices, respectively, and wherein the method further comprises:
    receiving an input in the first mobile portable device prompting the application to be shared from the first mobile portable device to the second mobile portable device; and
    in response to the input, forwarding the package from the first mobile portable device to the second mobile portable device, wherein the package is thereafter installed on the second mobile portable device.

9. The method of claim 1, wherein the application is initialized on the electronic device without being embedded in an HTML page.

10. A computer program product tangibly embodied in a non-transitory computer readable media and comprising instructions that when executed by a processor perform a method comprising:
    installing, in an electronic device, a package that contains an uninitialized application that (i) is configured to be embedded in a page conforming with hypertext markup language (HTML) and (ii) requires an HTML compliant variable for initialization of the application;
    detecting, in the electronic device, an instruction to initialize the application in an environment that is not an HTML compatible browser application;
    obtaining, in response to the instruction and from a file in the package, an application file name for an application file and at least one initialization value for the required HTML compliant variable;
    loading the application file identified by the application file name; and
    providing the at least one initialization value to the application prior to initialization of the application; and
    wherein the application is initialized in the environment using the at least one initialization value and is executed on the electronic device.

11. The program product of claim 10, further comprising instructions that when executed perform:
    loading a proxy file, wherein loading the proxy file causes the application file name and the initialization value for the required HTML compliant variable to be obtained, the application file to be loaded, and the initialization value to be provided to the application prior to the initialization of the application.

12. A computer-implemented method for providing an application for initialization on an electronic device, the method comprising:
    detecting, in a server device, an instruction to send a package that contains an application to an electronic device, the application (i) configured to be embedded in a page conforming with hypertext markup language (HTML) and (ii) requiring an HTML compliant variable for initialization, wherein the application is not initialized in an HTML compatible browser application;

generating at least one initialization value for the required HTML compliant variable for the electronic device; and forwarding, in response to the instruction, the package for installation on the electronic device, the package including a file that contains an application file name for an application file and the initialization value for the required HTML compliant variable.

13. The method of claim 12, wherein the application generates output on the electronic device using a program configured for swf format, and wherein the initialization value is generated to be compliant with the program.

14. The method of claim 12, wherein the electronic device includes at least one selected from the group consisting of: a wireless device, a mobile device, a cellular telephone, a consumer electronics device, a consumer appliance, and combinations thereof.

15. The method of claim 12, further comprising:
receiving, after forwarding the package, information from the electronic device reflecting at least one action that a user performs with the electronic device using the application; and
recording the information in association with corresponding information from other devices.

16. A computer program product tangibly embodied in a non-transitory computer readable medium and comprising instructions that when executed by a processor perform a method comprising:
detecting, in a server device, an instruction to send a package that contains an application to an electronic device, the application (i) configured to be embedded in a page conforming with hypertext markup language (HTML) and (ii) requiring an HTML compliant variable for initialization, wherein the application is not initialized in an HTML compatible browser application;
generating at least one initialization value for the required HTML compliant variable for the electronic device; and
forwarding, in response to the instruction, the package for installation on the electronic device, the package including a file that contains an application file name for an application file and the initialization value for the required HTML compliant variable.

17. An electronic device comprising:
a display device;
a processor configured to generate output for presentation on the display device; and
a computer readable storage medium having stored software for execution by the processor, the software including:
(i) a program configured for swf format and including an object for visualizing content on the display device; and
(ii) a package for initializing an uninitialized application on the electronic device, the application (a) configured to be embedded in a page conforming with hypertext markup language (HTML) and (b) requiring an HTML compliant variable for initialization, the package comprising (a) an application file, (b) at least one initialization value for the required HTML compliant variable, and (c) an application file name for the application file;
wherein the application file name is obtained from the package and used to load the application file into the object with the initialization value for initializing the application, and wherein the initialization value is provided to the application prior to initialization of the application, and the application is not initialized in an HTML compatible browser application.

18. The electronic device of claim 17, the package further including:
a proxy file, wherein loading the proxy file causes the application file name and the initialization value for the required HTML compliant variable to be obtained, the application file to be loaded, and the initialization value to be provided to the application for the initialization.

19. The electronic device of claim 17, wherein the file includes extensible markup language and the application file has a swf format.

20. The electronic device of claim 17, wherein the electronic device includes at least one selected from the group consisting of: a wireless device, a mobile device, a cellular telephone, a consumer electronics device, a consumer appliance, and combinations thereof.

21. A computer program product tangibly embodied in a non-transitory computer readable medium and comprising instructions that when executed by a processor generate:
a packaging tool configured to generate a package that contains an application to be installed on an electronic device, the application (i) configured to be embedded in a page conforming with hypertext markup language (HTML) and (ii) requiring an HTML compliant variable for initialization, the package comprising (a) an application file, (b) at least one initialization value for the HTML compliant variable, and (c) an application file name for the application file; and
a communication tool configured to detect an instruction to send the package to the electronic device, prompt the packaging tool to generate a package, and to forward, in response to the instruction, the package for installation on the electronic device;
wherein the application file name is obtained from the package and used to load the application file into the object with the initialization value for initializing the application, and wherein the initialization value is provided to the application prior to initialization of the application, and the application is not initialized in an HTML compatible browser application.

22. The computer program product of claim 21, wherein the packaging tool and the communication tool are generated in a tool configured to create content for the page compliant with HTML.

23. The computer program product of claim 21, the package further including:
a proxy file, wherein loading the proxy file causes the application file name and the initialization value for the HTML compliant variable to be obtained, the application file to be loaded, and the initialization value to be provided to the application for the initialization.

24. The computer program product of claim 21, wherein the page compliant with HTML is created in a tool that is not part of the computer program product and that is separate from the packaging tool and the communication tool.

* * * * *